July 18, 1933.  L. POETON  1,918,982
OPHTHALMIC MOUNTING
Filed Aug. 25, 1930
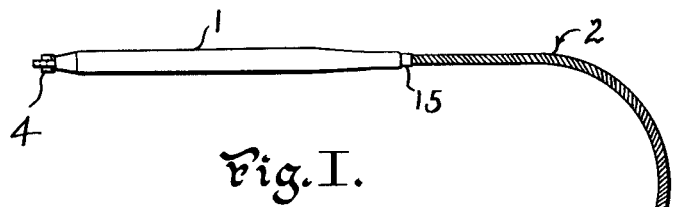
Fig. I.
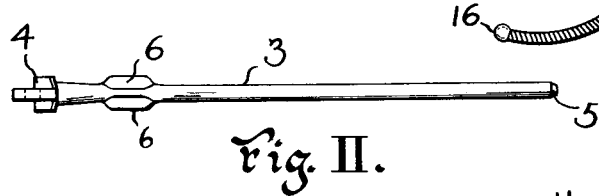
Fig. II.
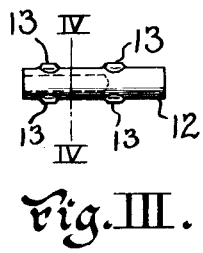
Fig. III.
Fig. IV.
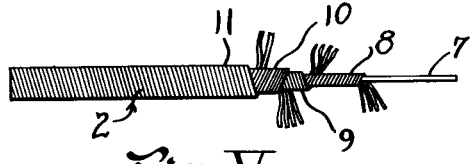
Fig. V.
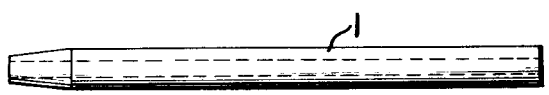
Fig. VI.
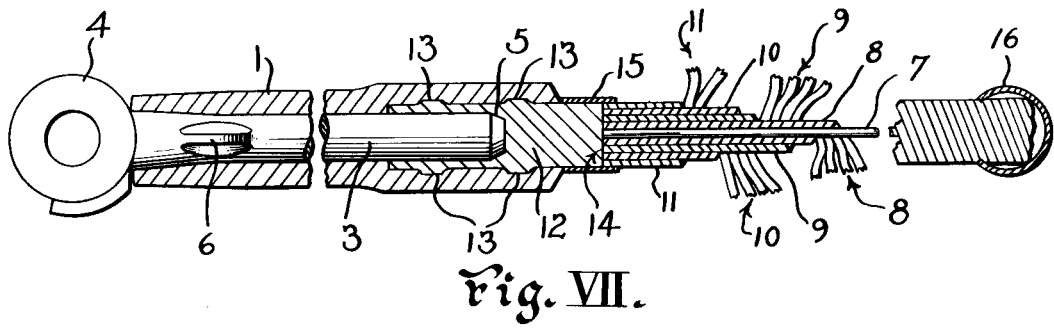
Fig. VII.
Lawrence Poeton
INVENTOR
BY Harry H. Styll
ATTORNEY Patented July 18, 1933

1,918,982

UNITED STATES PATENT OFFICE

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed August 25, 1930. Serial No. 477,675.

This invention relates to improvements in ophthalmic mountings and has particular reference to an improved form of temple for said mountings and to the process of making the same.

The principal object of the invention is to provide a construction for the temples of an ophthalmic mounting which will be very flexible, soft and comfortable upon the ears of the wearer and yet of sufficient rigidity to maintain the lenses in proper position before the eyes of the wearer.

Another object of the invention is to provide improved means of securing the flexible cable portion of a temple to the relatively rigid side portion of a temple.

Another object of the invention is to provide an improved construction for temples having a relatively rigid side portion and a flexible ear engaging portion.

Another object of the invention is to provide new and improved means of securing the metallic parts of a temple to the non-metallic parts.

Another object of the invention is to provide simple, efficient and durable means of forming a temple having a relatively rigid non-metallic side portion and a flexible metallic cable portion.

Other objects and advantages of the invention will become apparent from the following description taken in connection with the accompanying drawing, and it will be apparent that many changes in the steps of the process and in the arrangements and construction of parts may be made without departing from the spirit of the invention as expressed in the accompanying claims. I, therefore, do not wish to be limited to the exact details and arrangements shown, as the preferred forms and steps of the process only have been shown by way of illustration.

Referring to the drawing:

Fig. I is a side elevation of a temple embodying the invention;

Fig. II is a side view of the butt portion of the temple at a certain stage in the process;

Fig. III is a side elevation of a connecting member used in the process of manufacture of the temple;

Fig. IV is a cross section on line IV—IV of Fig. III;

Fig. V is a side elevation of the cable member at a certain stage in the process;

Fig. VI is a side elevation of the non-metallic covering portion for the temple;

Fig. VII is a longitudinal cross section through the finished temple showing the metallic and non-metallic parts in finished relationship.

It has been customary in the past when forming flexible temples for ophthalmic mountings to form the flexible portion from a series of hollow cable members. The object of forming the cable members hollow was to obtain flexibility and sufficient surface contact with the ears of the wearer to insure extreme comfort to the user.

The main disadvantage of this type of temple lies in the fact that while in use perspiration, dirt, etc., work their way through the cable members and are held in the pocket formed by the hollow cable members. This not only forms an unsanitary type of temple but also causes the temples to corrode and tarnish to affect the ears of the wearer and cause the temple portions to lose their flexibility and break during their continued use.

It, therefore, is the prime object of my invention to provide an improved temple for an ophthalmic mounting which will be of a flexible, comfortable nature and yet will not have any air spaces between the cores wherein dirt and perspiration may gather.

Referring to the drawing wherein similar reference characters denote corresponding parts throughout the several views, the improved temple consists preferably of a combination of a non-metallic straight portion 1 which is designed to rest adjacent the wearer's face and a resilient, metallic cable portion 2 which is formed to fit around the wearer's ear.

In the manufacture of this improved temple a metallic butt member 3 is first formed with a hinge portion 4 at one end and a tapered portion 5 at the opposite end. Adjacent the hinge end 4 there is provided a plurality of flattened or winged portions 6. The butt member 3 is pressed into the straight, non-metallic portion 1 and is locked therein adjacent the hinge end of the butt by the wing members 6. To form the resilient and yet firm ear loop portion 2 previously mentioned, a series of oppositely wound cable members are formed one over the other on the solid inner core member 7. The cable portion comprises the solid member 7 having four strand windings 8, 9 and 10, and a two strand winding 11 thereon. The three cable windings 8, 9 and 10 of four strands each are wound in opposite directions and are formed from a base metal, such as German silver or the like. The outer cable 11 is wound in the opposite direction to the inner cable and is formed of two gold-filled wires or some similar precious metal. Each cable is reduced after each individual winding and is of a size which will give the desired finished diameter to the cable portion and the desired flexibility. The cable member 2 is then cut to length and is soldered to a perforated connecting member 12, illustrated in Fig. III. The connecting member 12 is provided with a series of projections or corrugations 13, the purpose of which will presently be described.

In forming the temple I first press the butt portion 3 within the tubular side member 1 until the two are rigidly united by the projections or wing members 6. I next solder the connecting member 12 to the cable portion 2 along the line 14 and then place a reinforcing sleeve member 15 over the line of joinder. A suitable tip portion 16 is then rolled or pressed onto the free end of the cable portion to provide a finished tip. The cable member 2 and connecting member 12 are then pressed into the tubular member 1 to position the connecting member 12 within the tube and place the recessed portion over the tapered end of the butt member 3. The connecting member 12 is secured within the non-metallic side member 1 by means of the corrugated projections 13 and any suitable adhesive, such as cement or the like. To give the finished shape to the temple it may be pressed under heated forming dies to flatten the non-metallic side portions if desired. Attention is called to the fact that the butt portion 3 and connecting member 12 are not soldered or swaged together but are held in engagement solely by the outer non-metallic covering 1 which engages with and adheres to the projections 13 formed on the connecting member 12.

It is apparent, however, that if desired the temple may be soldered at this connection.

The inner core member 7 and the cable members 8, 9, 10 and 11 are formed from very resilient material and, therefore, provide a very flexible and comfortable ear engaging portion. The cable members are wound in opposite directions and are swaged one over the other at each winding so that there are no air spaces between the cable members when the flexible ear engaging member 2 is finished and ready for use. This obviates the possibility of the collection of dirt or perspiration as has been usual in the prior art hollow cable temples. In view of the fact that the cables are swaged over each other after the completion of each winding it is obvious that perspiration cannot enter and cause corrosion. The temple, therefore, is very simple in its construction, quick and easy to assemble, and is very sanitary and durable. The parts are not susceptible to destructive corrosions which reduce the resiliency and life of the cable members and render the temples impractical for use.

From the foregoing description it will be seen that I have provided a construction for a temple for an ophthalmic mounting which will be flexible in adjustment, comfortable to wear and durable enough to retain its shape throughout the life of the mounting.

Having described my invention, I claim:

1. A temple for an ophthalmic mounting comprising a butt portion having a hinge connection and surface projections adjacent one end thereof, a non-metallic member on the butt portion held in engagement therewith by the projections, a flexible cable member and a connecting member having a solid portion at one end secured to the cable member and having a recessed portion at its opposite end positioned within the non-metallic member and over the end of the butt portion and having projections thereon adapted to interlock with the non-metallic member to hold the parts in assembled position.

2. A temple for an ophthalmic mounting comprising a butt portion having a hinge connection and surface projections adjacent one end thereof and a tapered portion at the opposite end, a non-metallic member on the butt portion held in engagement therewith by the surface projections, a flexible cable member and a connecting member having an unpierced portion at one end secured to the cable member and having a recessed portion at its opposite end positioned within the non-metallic member and over the tapered end of the butt portion and having surface projections thereon adapted to interlock with the non-metallic member to hold the parts in assembled position.

3. A temple for an ophthalmic mounting comprising a butt portion having surface projections adjacent one end thereof and a tapered portion at the opposite end, a tubular non-metallic member on the butt portion held in engagement therewith by the surface projections, a flexible cable member and a connecting member having an unpierced portion at one end secured to the cable member and having a recessed portion at its opposite end positioned within the tubular nonmetallic member and over the tapered end of the butt portion and having surface projections thereon adapted to interlock with the non-metallic member to hold the parts in assembled position.

4. The process of forming a temple for an ophthalmic mounting comprising forming a butt portion with surface projections adjacent one end thereof, placing a non-metallic member on the butt portion and pressing it into engagement with the surface projections, winding a flexible cable member and securing one end thereof to a recessed connecting member, forming surface projections on said connecting member, pressing the connecting member within the non-metallic member and over the end of the butt portion to embed the surface projections within the non-metallic member to hold the parts in assembled position.

5. The process of forming a temple for an ophthalmic mounting comprising forming a butt portion with surface projections adjacent one end thereof, placing a tubular non-metallic member on the butt portion and forcing it into interlocking engagement with the surface projections, winding a flexible cable member and securing one end thereof to a recessed connecting member, forming surface projections on said connecting member and pressing the perforated end of the connecting member within the tubular non-metallic member and over the end of the butt portion to embed the surface projections within the non-metallic member to hold the parts in assembled position.

6. The process of forming a temple for an ophthalmic mounting comprising forming a butt portion with surface projections adjacent one end thereof, placing a non-metallic member on the butt portion and forcing it into interlocking engagement with the surface projections, winding a flexible cable member and securing one end thereof to a recessed connecting member, forming surface projections on said connecting member and pressing the perforated end of the connecting member within the non-metallic member and over the end of the butt portion to embed the surface projections within the non-metallic tubular member to hold the parts in assembled position.

7. The process of forming a temple for an ophthalmic mounting comprising forming a butt portion with surface projections adjacent one end thereof, placing a non-metallic tubular member on the butt portion and forcing it into interlocking engagement with the surface projections of the said butt portion, winding a flexible cable member and securing one end thereof to a recessed connecting member forming surface projections on said connecting member, pressing the perforated end of the connecting member within the non-metallic tubular member and over the end of the butt portion to embed the surface projections within the non-metallic member to hold the parts in assembled position and placing a tubular sleeve member over the connecting point of the cable to the connecting member.

8. In a device of the character described, a butt portion having a hinge connection adjacent one end thereby, an intermediate connecting portion having a sleeve portion fitting over the butt portion and having a solid portion on the end opposite the sleeve and a cable portion comprising a plurality of strands wound alternately on a solid core secured to the solid portion.

9. The process of forming a temple for an ophthalmic mounting comprising forming a butt portion with surface projections thereon, forming a temple portion with surface projections and a recessed portion adapted to receive the butt portion, forming a tubular member, pressing the butt portion and temple portion into the tubular portion, whereby the projecting portions are forced into interlocking engagement with the tubular portion with the butt portion extending into the recess in the temple portion.

10. A temple for an ophthalmic mounting comprising a butt portion having a hinge connection and surface projections adjacent one end thereof, a non-metallic member on the butt portion held in engagement therewith by the projections and a temple portion having surface projections thereon and a recessed portion adapted to receive the end of the butt portion, said temple portion being positioned within the non-metallic member and over the end of the butt portion with its surface projections interlocking with the non-metallic member to hold the parts in assembled position.

LAWRENCE POETON.